United States Patent
Bulakci et al.

(10) Patent No.: US 10,499,218 B2
(45) Date of Patent: Dec. 3, 2019

(54) METHOD FOR ACTIVATING A NOMADIC NODE, AS WELL AS A CORRESPONDING NOMADIC NODE AND SYSTEM

(71) Applicant: Huawei Technologies Co., Ltd., Shenzhen, Guangdong (CN)

(72) Inventors: Ömer Bulakci, Munich (DE); Alexandros Kaloxylos, Munich (DE); Josef Eichinger, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/873,797

(22) Filed: Jan. 17, 2018

(65) Prior Publication Data
US 2018/0146355 A1    May 24, 2018

Related U.S. Application Data

(63) Continuation of application No. PCT/EP2015/066846, filed on Jul. 23, 2015.

(51) Int. Cl.
*H04W 4/44* (2018.01)
*H04W 24/02* (2009.01)
(Continued)

(52) U.S. Cl.
CPC .............. *H04W 4/44* (2018.02); *H04W 8/08* (2013.01); *H04W 8/24* (2013.01); *H04W 24/02* (2013.01);
(Continued)

(58) Field of Classification Search
CPC ........... H04W 4/02; H04W 4/44; H04W 8/08; H04W 8/24; H04W 48/08; H04W 48/02; H04W 84/00; H04W 84/005
See application file for complete search history.

(56) References Cited

U.S. PATENT DOCUMENTS

| 2006/0148479 A1* | 7/2006 | Park | H04W 36/026 455/437 |
| 2010/0082513 A1* | 4/2010 | Liu | H04L 63/1458 706/46 |

(Continued)

FOREIGN PATENT DOCUMENTS

| CN | 102857945 A | 1/2013 |
| CN | 103733683 A | 4/2014 |
| WO | 2015053685 A1 | 4/2015 |

OTHER PUBLICATIONS

Bulakci et al.; "Towards Flexible Network Deployment in 5G:Nomadic Node Enhancement to Heterogeneous Networks"; 2015 IEEE International Conference on Communication Workshop (ICCW); London, UK; Jun. 8-12, 2015; 6 pages.
(Continued)

*Primary Examiner* — Hassan Kizou
*Assistant Examiner* — Deepa Belur
(74) *Attorney, Agent, or Firm* — Conley Rose, P.C.

(57) ABSTRACT

The present disclosure refers to a method for activating a Nomadic Node (NN) in a wireless communication network comprising at least one NN 304, wherein said at least one NN 304 is provided on a vehicle, at least one Base Station, (BS) 301, 302, 303, and a NN control means 200, comprising the steps of collecting, by the NN control means 200, information elements in said wireless communication network, and activating, by the NN control means 200, said at least one NN 304 on the basis of the collected information elements. The disclosure further refers to a corresponding NN control means 200 and system.

14 Claims, 6 Drawing Sheets

(51) Int. Cl.
*H04W 8/08* (2009.01)
*H04W 8/24* (2009.01)
*H04W 72/04* (2009.01)
*H04W 84/00* (2009.01)

(52) U.S. Cl.
CPC ...... *H04W 72/0406* (2013.01); *H04W 84/005* (2013.01)

(56) References Cited

U.S. PATENT DOCUMENTS

| | | | |
|---|---|---|---|
| 2012/0087303 A1 | 4/2012 | Kwon et al. | |
| 2013/0183971 A1 | 7/2013 | Tamaki et al. | |
| 2014/0206379 A1* | 7/2014 | Mayor | H04W 64/006 455/456.1 |
| 2015/0223145 A1* | 8/2015 | Yoon | H04W 48/04 370/328 |
| 2016/0021503 A1* | 1/2016 | Tapia | H04W 24/02 455/456.1 |
| 2016/0269910 A1* | 9/2016 | Lindqvist | H04W 16/04 |
| 2017/0180090 A1* | 6/2017 | Park | H04L 5/0035 |
| 2018/0199218 A1* | 7/2018 | Ashrafi | H04W 24/04 |
| 2019/0082379 A1* | 3/2019 | Abouelseoud | H04W 48/10 |

OTHER PUBLICATIONS

Bulakci et al.; "Dynamic Nomadic Node Selection for Performance Enhancement in Composite Fading/Shadowing Environments"; 2014 IEEE 79th Vehicular Technology Conference (VTC Spring); Seoul, South Korea; May 18-21, 2014; 5 pages.
"3rd Generation Partnership Project; Technical Specification Group Radio Access Network; Evolved Universal Terrestrial Radio Access (E-UTRA); Further advancements for E-UTRA physical layer aspects (Release 9)"; 3GPP TR 36.814 V9.0.0; Mar. 2010; 104 pages.
"3rd Generation Partnership Project; Technical Specification Group Radio Access Network; Evolved Universal Terrestrial Radio Access (E-UTRA); Study on mobile relay (Release 12)"; 3GPP TR 36.836 V12.0.0; Jun. 2014; 36 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 13)"; 3GPP TS 36.300 V13.0.0; Jun. 2015; 254 pages.
"3rd Generation Partnership Project; Technical Specification Group Services and System Aspects; Telecommunication management; Principles and high level requirements (Release 11)"; 3GPP TS 32.101 V11.4.0; Jun. 2015; 67 pages.
J. Robson, Ed. for NGMN Alliance; "Guidelines for LTE Backhaul Traffic Estimation"; v0.4.2 Final; Jul. 3, 2011; 18 pages.
Machine Translation and Abstract of Chinese Publication No. CN102857945, Jan. 2, 2013, 17 pages.
Foreign Communication From a Counterpart Application, Chinese Application No. 201580081237.X, Chinese Office Action dated Jul. 29, 2019, 8 pages.

* cited by examiner

METHOD FOR ACTIVATING A NOMADIC NODE, AS WELL AS A CORRESPONDING NOMADIC NODE AND SYSTEM

CROSS-REFERENCE TO RELATED APPLICATIONS

This application is a continuation of International Application No. PCT/EP2015/066846, filed on Jul. 23, 2015, which is hereby incorporated by reference in its entirety.

TECHNICAL FIELD

The present application is directed to a method for activating a Nomadic Node (NN) in a wireless communication network. The present disclosure is also directed to a corresponding NN and system. The present disclosure particularly relates to an efficient integration of a NN provided on a vehicle into a wireless communication network, such as, for example LTE and future systems beyond LTE, as well as any other current or future wireless communication systems or networks.

BACKGROUND

Current and next generation mobile and wireless communication systems, for example, LTE, LTE-A, LTE new Releases, and Fifth Generation (5G), aim at providing ubiquitous user experience with the utmost in quality. To this end, flexible network deployment is desired, in particular the flexibility to increase the network capacity and/or to extend a cell coverage on demand.

One approach known in the state of the art for providing coverage and/or capacity is to deploy fixed small cells, for example picocells, femtocells, and relay nodes overlaid by macrocells. These small cells may be deployed by operators at certain locations with power supply facilities, and the locations can be determined, for example, via network planning. Access nodes of the small cells are usually well elevated (e.g., 5 m), which reduces the impact of fading, for example, on the wireless backhaul link of relay nodes. Macrocells can also provide a backhaul link to relay nodes, for example, in LTE-A Type 1 relay node deployments (in 3GPP TR36.814 v9.0.0). In case of picocells, the backhaul can be provided by wired connections, e.g., fiber, or by wireless connections, e.g., microwave links.

Another approach known in the state of the art for providing temporal service provisioning is the use of movable relays. Operator-owned movable relays can be moved to a pre-determined service region, and can then be directly activated (e.g., manual control). Further, operator-owned moving relays, as for instance described in 3GPP TR 36.836 v12.0.0, can be mounted on public transportation vehicles or high-speed trains, in order to serve passengers or users on the road or at bus stations.

In the aforementioned approaches, operators typically have the ownership of the wireless access nodes, and can control the availability of the access nodes. When the access nodes are activated, they typically perform a registration process continuously, until they are granted by the network.

A promising technology targeted for flexible network deployment bases on Nomadic Nodes, NNs. An NN is a preferably a movable access node, which can provide coverage extension and/or capacity improvement on demand. NNs can be mounted on vehicles, for example, within a car-sharing fleet.

However, NNs are associated with some uncertainty with regards to their availability, i.e. whether an NN is or is not available in a target service region that requires on-demand increase of network capacity and/or extension of the cell coverage area. The uncertainty is, for instance, caused by human behavior (e.g., drivers). That is, human behavior determines the location of vehicles, and can only be predicted to some extent (e.g. a parking lot around a shopping mall for a given day time). Therefore, in case of NN operation, the network needs to take decisions on-the-fly, which cope with this uncertainty.

A flexible backhaul may be needed to be employed, wherein the capacity of the backhaul link can play a crucial role in the end-to-end user performance. The backhaul of a nomadic node NN can be realized via a wireless connection, e.g., in-band half-duplex operation and/or out-band full-duplex operation, as well as wired connection, e.g., while the nomadic node battery is being charged. In case of a wireless connection, the backhaul link can be served by a base station (BS). A BS can be a macro BS or micro BS considering, e.g., inter-site distance (ISD), and a pico BS, e.g., considering the cell size. There can be multiple BSs in a region by which the backhaul link of the nomadic node NN can be served.

Accordingly, an automated operation of a dynamic network, in which NNs do not necessarily belong to and fully configured by the operator (e.g., nomadic nodes form a private wireless network) and NNs occasionally change locations and availability, is challenging. In particular, NN activation and the corresponding process should be carried out in an automated manner without additional manual control, as for instance by network planning teams, in order to increase the operation efficiency. Operation efficiency is particularly important given that NNs may operate on vehicle battery. That means, the capacity of a vehicle battery needs to be shared appropriately between conventional vehicle functions and NN functions, and NNs should be activated on demand, for instance based on target service requirements in a target service region, nomadic node capabilities and the backhaul link qualities toward possible serving access nodes, in order to optimize the achievable gains. In addition, since the activation of NNs depends on the availability of other NNs in the target service region, a tight coordination is needed to provide uninterrupted service.

SUMMARY

In view of the above mentioned disadvantage of the state of the art and the challenges for NN based operation, the present disclosure aims to improve the state of the art. In particular, the present disclosure has the object to provide a method, a NN and a system for enabling an automated and more efficient operation of a wireless dynamic communication network comprising at least one NN. In addition, the present disclosure should be usable for networks, in which NNs do not necessarily belong to an operator, and in which NNs change their location and availability. Thus, the present disclosure should provide a method, a NN and a system which support on-demand network densification via the at least one NN, so that the network densification can be temporarily and dynamically performed. Further, the present disclosure aims to provide activation (and deactivation) processes for NNs, which are carried out automatically without the need for a manual control.

The present disclosure particularly aims to address an efficient integration of NNs into wireless communication systems and wireless mobile communication systems. The mobile communication systems and wireless communication systems may comprise at least one BS. To this end, mechanisms are proposed where decisions are taken by a NN control means to determine NNs to be activated on the basis of information elements collected from one or more entities in the wireless communication network.

The above-mentioned objects of the present disclosure are achieved by the solution provided in the enclosed independent claims. Advantageous implementations of the present disclosure are further defined in the respective dependent claims. In particular, in the present disclosure, at least one NN is activated, i.e., put into operation, based on information elements collected by a NN control means in the wireless communication network, wherein the wireless communication network comprises at least one NN provided on a vehicle, at least one BS, and the mentioned NN control means.

A first aspect of the present disclosure provides a method for activating a Nomadic Node, NN, in a wireless communication network comprising at least one NN, wherein the at least NN is provided on a vehicle, at least one Base Station, BS, and a NN control means comprising the steps of collecting by the NN control means, information elements in the wireless communication network, and activating, by the NN control means, the at least one NN on the basis of the collected information elements.

The activation method of the first aspect of the disclosure enables an on-demand temporal densification of nodes of the network, and thus enables increased capacity and/or extended cell coverage. Specifically, the NNs may be put into operation (activated), based on the information elements collected by the NN control means, wherein the information elements comprise information, data, instructions and so forth collected and obtained from various entities in the wireless communication network. For example, the information elements may comprise information regarding the demand requirements in, for example, a Target Service Region of the wireless communication network, where NNs are residing, for example coverage and capacity, service requirements, e.g., target bit rate along with delay tolerance, long-term and short-term measurements from BSs on the backhaul link, antenna characteristics and antenna capabilities, NN owner preferences and so forth. Also, the NNs may be taken from operation (deactivated) when for example the service is not needed anymore or the backhaul link quality is not sufficient to address the service requirement. The activation (and deactivation) mechanisms for NNs of the disclosure can be context-aware to efficiently meet the service requirements of the wireless network. Thus, the activation method of the disclosure allows for a more efficient operation and integration of NNs into a wireless communication network. Advantageously, NNs can be activated or deactivated in reference to a Target Service Region, for example in relation to Target Service Requirements in the Target Service Region.

The activation method of the first aspect of the disclosure may apply to a single NN as well as to a plurality of NNs. A NN may serve out-vehicle users as well as in-vehicle users. A user in the present context can be a user equipment UE, as in the LTE standard or a machine, for example a wireless sensor, actuator, or activator. In the present context, the terms User Equipment (UE) and Mobile Terminal (MT) have the same meaning and are used interchangeably. During operation, a NN may be stationary or may be moving with a low speed together with its vehicle on which it is provided. The motion state of the NN, i.e., whether the NN is stationary or moves with a certain speed may for example be determined based on a determined threshold value of the NN speed, i.e., of the speed of the vehicle on which the respective NN is provided. Further, a NN may include and provide multi-operator support. That is, the NN may be utilized by a plurality of mobile network operators and may not be limited to the use by a single mobile network operator. The NNs (the vehicles on which they are respectively provided) may be parked along a road or in a parking lot. There can be more than one NN available in a Target Service Region. The NN operation may be based on the state of the vehicle battery (i.e., the NN uses the battery of the vehicle on which it is provided as the energy source, or grid power, for example while charging the battery).

A vehicle may be any kind of mobile facility. For example, a vehicle can be a car, a truck, a train, an airplane, a helicopter and so forth. However, a vehicle can also be a mobile carrier of a NN, for example a cell phone, a tablet, a computer and other types of vessels (e.g., unmanned aerial vehicle (UAV)), or the like. The NN can itself be a portable, moveable and/or handheld facility and/or entity.

Simple motion states of the vehicle may include "moving vehicle" and "not-moving vehicle". A simple location state of the vehicle may be its current position defined by latitude and longitude, or angular and radial distance with respect to a reference point, such as for example a BS. Simple operation states may be "switched-on vehicle" and "switched-off vehicle".

Preferably, in the frame of the present disclosure, a NN or a set of NNs shall be selected as Serving Node(s) in a determined Target Service Region. During the operation, NNs may depart and arrive. Thus, there is some uncertainty, which can be due to human/driver behavior. As the serving (active) NNs depart, a service interruption shall be avoided. The NNs may be owned by another service provider different from the mobile network operator. Thus, NN owner preferences may include the NN operation. The NNs may be served by a BS or a plurality of BSs. The serving BS or BSs of the NNs can be selected from the plurality of candidate serving BSs. Due to the nomadic and movable nature of the NNs, the target serving BS or BSs shall be dynamically determined during the operation.

In a first implementation form of the method according to the first aspect as such, the method further comprises a step of selecting a serving BS for the at least one activated NN from the at least one BS. This selecting step can, for example, be performed by the NN control means alone, or by both the NN control means and a Control and Management means explained later. This selecting step is preferably performed before the activating step. Hereby, selecting the serving BS is done by the NN control means and/or the Control and Management means before the activation command. The activation command can then, for example, include the serving BS information. The method can further advantageously comprise, after the activating step, a step of connecting the at least one activated NN to the selected serving BS. Also, preferably, the NN control means may send a set of candidate serving BSs that the activated NN can connect to, to the activated NN. The activated NN may then select the actual serving BS from this set based on its experienced backhaul link quality or another suitable parameter.

In a second implementation form of the method according to the first aspect as such or according to the first implementation form of the first aspect, collecting the information elements by the NN control means comprises collecting the information elements from the at least one NN and/or at least one BS and/or a network means which provide service requirements. The mentioned network means can be, for example, Policy and Charging Rules Function (PCRF) as in LTE, and/or Application Programming Interface (API) as considered in European Telecommunications Standards Institute (ETSI) network functions virtualization (NFV) specification.

In a third implementation form of the method according to the first aspect as such or according to the first or second implementation form of the first aspect, the method further comprises communicating, by the NN control means, with a control and management means comprised in the wireless communication network, wherein collecting the information elements by the NN control means comprises collecting the information elements from the at least on NN and/or at least one BS and/or a network means which provides service requirements and/or the Control and Management means.

Generally, in the method of the first aspect of the disclosure, and its implementation forms the activation of the at least one NN by the NN control means is based on the collected information elements received from one or more entities of the wireless communication network. The entities, as defined in the first and the second implementation form, may be the at least one NN, at least one BS, and/or Control and Management means, and/or network means which provides service requirements, or even other entities. The information elements may, as further defined below, comprise any kind of data or information collected from these entities, or even instructions, commands or the like received from these entities.

In a fourth implementation form of the method according to the first aspect as such or according to the first, second or third implementation form of the first aspect, the information elements include at least one of: backhaul link quality, NN capabilities, NN owner preferences, NN location/parking duration history, NN expected parking duration, NN identifiers, BS loads, NN radio measurements from BSs, coverage needs, capacity needs, service requirements, and NN activation requests. It is to be understood that the information elements may include any kind of combination of two, three or more information elements as listed above.

In a fifth implementation form of the method according to the first aspect as such or according to one of the first to fourth implementation forms of the first aspect, in the activating step, the at least one NN as activated from an idle mode into an activated mode, the idle mode being a mode in which the at least NN is not registered to the NN control means and not prepared to actively serve a Mobile Terminal in the wireless communication network, and the activated mode being a mode in which said at least one NN is prepared to actively serve a Mobile Terminal in the wireless communication network.

In a sixth implementation form of the method according to the first aspect as such or according to one of the first to fourth implementation form of the first aspect, in the activating step, the at least one NN is activated from a candidate mode into an activated mode, the activated mode being a mode in which the at least one NN is prepared to actively serve a Mobile Terminal in the wireless communication network and the candidate mode being a mode in which at least one NN is registered to the NN control means as a potential NN and not prepared to actively serve a Mobile Terminal in the wireless communication network. The activated mode is also called as the active mode or the serving mode or the actively serving mode in the present context. The candidate mode is also called potential mode in the present context.

In a seventh implementation form of the method according to the first aspect as such or according to one of the first to sixth implementation form of the first aspect, the method further comprises, before the activating step, a step of registering, by the NN control means, the at least one NN to the NN control means, wherein the wireless communication network comprises only a single NN control unit as the NN control means, and the at least one NN is registered to the single NN control unit in the registering step. This implementation form is also called the centralized implementation form or method.

In an eighth implementation form of the method according to the first aspect as such or according to one of the first to sixth implementation form of the first aspect, the method further comprises, before the activating step, a step of registering, by the NN control means, the at least one NN to the NN control means, wherein the wireless communication network comprises at least two distributed NN control entities as the NN control means, each of the at least two distributed NN control entities being respectively located at a BS of said wireless communication network, wherein said at least one NN is registered to each of said at least two distributed NN control entities in the registering step. This implementation form is also called the distributed implementation form or distributed method.

In a ninth implementation form of the method according to the first aspect as such or according to one of the first to sixth implementation form of the first aspect, the method further comprises, before the activating step, a step of registering, by the NN control means, the at least one NN to the NN control means, wherein the wireless communication network comprises at least two distributed NN control entities as the NN control means, each of the at least two distributed NN control entities being respectively located at a BS of the wireless communication network, wherein the at least one NN is registered to only a single one of the at least two distributed NN control entities in the registering step. This implementation form is also called the hybrid implementation form or hybrid method.

In a tenth implementation form of the method according to the first aspect as such or according to one of the first to ninth implementation form of the first aspect, the method further comprises the step of configuring, by the NN control means, a mirror NN for each activated NN with the same or similar configuration as the respective active NN, a mirror NN being a NN with a at least partially overlapping coverage area as the respective activated NN. Similar configuration can imply, e.g., modifications to the same configuration to factor in, such as, partially overlapping coverage. Hereby, all the statements made above in relation to the first implementation form, i.e. the selection of a serving BS and the connection of the activated NN to the selected BS, also identically apply to the mirror NN, for which a serving BS is also selected in the same way as for the corresponding activated NN by the NN control means and/or the Control and Management means. The serving BS selected for the mirror NN can be the same as the one selected for the activated NN, or can be a different BS.

In an eleventh implementation form of the method according to the tenth implementation form of the first aspect, the NN control means activates the respective mirror NN as the new activated NN, when an activated NN is deactivated.

In an twelfth implementation form of the method according to the eleventh implementation form of the first aspect, the NN control means configures a new mirror NN from NNs in the wireless communication network with a same or similar configuration as the new activated NN. Similar configuration can imply, e.g., modifications to the same configuration to factor in, such as, partially overlapping coverage.

A second aspect of the present disclosure provides a Nomadic Node (NN) control means for a wireless communication network comprising at least one NN provided on a vehicle, at least one base station (BS) and a NN control means, the NN control means comprising collecting means adapted to collect information elements in the wireless communication network, and activating means adapted to activate the at least one NN on the basis of collected information elements.

In a first implementation form of the NN control means according to the second aspect as such, the NN control means further comprises a selecting means adapted to collect a serving BS for the at least one activated NN from the at least one BS.

In a second implementation form of the NN control means according to the second aspect as such or according to the first implementation form of the second aspect, the collecting means is adapted to collect the information elements from the at least one NN and/or the at least one BS and/or a network means which provides service requirements.

In a third implementation form of the NN control means according to the second aspect as such or according to the first or second implementation form of the second aspect, the NN control means is further adapted to communicate with a Control and Management means comprised in the wireless communication network, wherein the collecting means is adapted to collect the information elements from the at least on NN and/or the at least one BS and/or the Control and Management means and/or a network means which provides service requirements.

Generally, in the NN control means of the second aspect of the disclosure, and its implementation forms the activation of the at least one NN by the NN control means is based on the collected information elements received from one or more entities of the wireless communication network. The entities, as defined in the first and the second implementation form, may be the at least one NN, at least one BS, and/or the Control and Management means, and/or the network means which provides service requirements, or even other entities. The information elements may, as further defined below, comprise any kind of data or information collected from these entities, or even instructions, commands or the like received from these entities.

In a fourth implementation form of the NN control means according to the second aspect as such or according to the first, second or third implementation form of the second aspect, the information elements include at least one of: backhaul link quality, NN capabilities, NN owner preferences, NN location/parking duration history, NN expected parking duration, NN identifiers, BS loads, NN radio measurements from BSs, coverage needs, capacity needs, service requirements, and NN activation requests. It is to be understood that the information elements may include any kind of combination of two, three or more information elements as listed above.

In a fifth implementation form of the NN control means according to the second aspect as such or according to one of the first to fourth implementation form of the second aspect, the activating means is adapted to activate the at least one NN from an idle mode into an activated mode, the idle mode being a mode in which the at least NN is not registered to the NN control means and not prepared to actively serve a Mobile Terminal in the wireless communication network, and the activated mode being a mode in which the at least one NN is prepared to actively serve a Mobile Terminal and the wireless communication network.

In a sixth implementation form of the NN control means according to the second aspect as such or according to one of the first to fourth implementation form of the second aspect, the activating means is adapted to activate the at least one NN from a candidate mode into an activated mode, the activated mode being a mode in which the at least one NN is prepared to actively serve a Mobile Terminal in the wireless communication network and the candidate mode being a mode in which the at least one NN is registered to the NN control means as a potential NN and not prepared to actively serve a Mobile Terminal in the wireless communication network. The activated mode is also called as the active mode or the serving mode or the actively serving mode in the present context. The candidate mode is also called potential mode in the present context.

In a seventh implementation form of the NN control means according to the second aspect as such or according to one of the first to sixth implementation form of the second aspect, the NN control means further comprises a registering means adapted to register the at least one NN to the NN control means, wherein the wireless communication network comprises only a single NN control unit as the NN control means, and the at least one NN is registered to the single NN control unit by the registering means. This implementation form is also called the centralized implementation form or method.

In an eighth implementation form of the NN control means according to the second aspect as such or according to one of the first to sixth implementation form of the second aspect, the NN control means further comprises a registering means adapted to register the at least one NN to the NN control means, wherein the wireless communication network comprises at least two distributed NN control entities as the NN control means, each of the at least two distributed NN control entities being respectively located at a BS of the wireless communication network, wherein the at least one NN is registered to each of the at least two distributed NN control entities by the registering means. This implementation form is also called the distributed implementation form or distributed method.

In a ninth implementation form of the NN control means according to the second aspect as such or according to one of the first to sixth implementation form of the second aspect, the NN control means further comprises a registering means adapted to register the at least one NN to the NN control means, wherein the wireless communication network comprises at least two distributed NN control entities as the NN control means, each of the at least two distributed NN control entities being respectively located at a BS of the wireless communication network, wherein the at least one NN is registered to only a single one of the at least two distributed NN control entities by the registering means. This implementation form is also called the hybrid implementation form or hybrid method.

In a tenth implementation form of the NN control means according to the second aspect as such or according to one of the first to ninth implementation form of the second aspect, the NN control means further comprises a configuring means adapted to configure a mirror NN for each activated NN with the same or similar configuration as the respective active NN, a mirror NN being a NN with a at least partially overlapping coverage area as the respective activated NN. Similar configuration can imply, e.g., modifications to the same configuration to factor in, such as, partially overlapping coverage.

In an eleventh implementation form of the NN control means according to the tenth implementation form of the second aspect, the NN control means is adapted to activate the respective mirror NN as the new activated NN when an activated NN is deactivated.

In an twelfth implementation form of the NN control means according to the eleventh implementation form of the second aspect, the configuring means is adapted to configure a new mirror NN from NNs in the wireless communication network with a same or similar configuration as the new activated NN. Similar configuration can imply, e.g., modifications to the same configuration to factor in, such as, partially overlapping coverage.

A third aspect of the present disclosure provides a system for a wireless communication network, comprising at least one Nomadic Node (NN) on a vehicle, at least one Base Station (BS) and NN control means according to the second aspect as such or one of the first to twelfth implementation forms of the second aspect.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be full formed by eternal entities not reflected in the description of a specific detailed element of that entity which performs that specific step or functionality, it should be clear for a skilled person that these methods and functionalities can be implemented in respective software or hardware elements, or any kind of combination thereof. Further, it is to be understood that each functionality described in combination with or for a respective entity of the system of the present disclosure is intended to also be the disclosure of a corresponding method to be performed by the respective entity or the respective entities. Also, each advantage or technical effect described in relation to a method step or steps are intended to identically be valid for the corresponding functionalities of entities.

BRIEF DESCRIPTION OF THE DRAWINGS

The above-described aspects and implementation forms of the present disclosure will be explained in the following description of specific embodiments in relation to the enclosed drawings, in which.

DETAILED DESCRIPTION OF EMBODIMENTS

Figure 1:
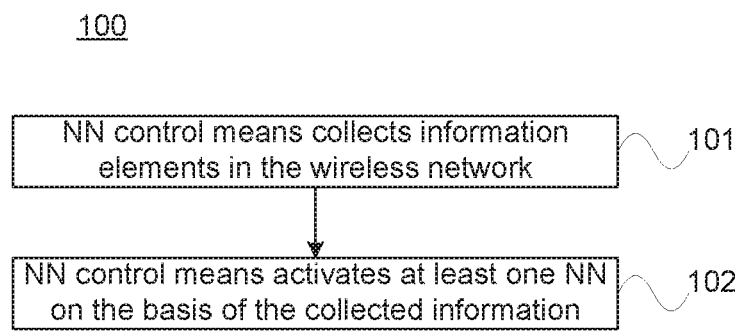
FIG. 1 shows a basic embodiment of a method according to the present disclosure.

FIG. 1 shows a basic embodiment of a method according to the disclosure. This basic embodiment of the method 100 according to the disclosure, together with the basic embodiment of a Nomadic Node (NN) 304 shown in FIG. 2, form the basis for all further embodiments and examples of the present disclosure described in relation to the figures and the following description. The method 100 shown in FIG. 1 is a method for activating a NN in a wireless communication network which comprises at least one NN 304 (as shown in the following figures), wherein the at least one NN 304 is provided on a vehicle. The wireless communication network further comprises at least one Base Station (BS) 301, 302, 303 (as shown in the following figures) and a NN control means 200 (also shown in the following figures, particularly FIG. 2). The method 100 of FIG. 1 comprises the steps of collecting 101, by the NN control means 200, information elements in the wireless communication network, and activating 102 by the NN control means 200, the at least one NN 304 on the basis of the collected information elements. Similarly, the NN control means 200 as shown in the basic embodiment of FIG. 2, comprises collecting means 201 adapted to collect information elements in the wireless communication network, and activating means 202 adapted to activate the at least one NN 304 on the basis of the collected information elements.

Figure 2:
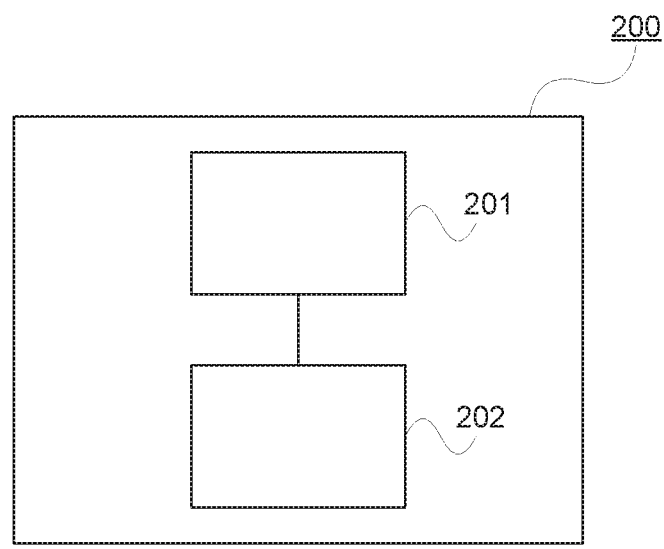
FIG. 2 shows a basic embodiment of a Nomadic Node, NN, of the present disclosure.

It is to be understood that the basic method embodiment of FIG. 1 and the basic NN control means embodiment of FIG. 2 may, in further examples or advantageous embodiments, comprise additional optional method steps, functionalities and means or units to perform the respective functionalities as defined in the enclosed claims, as defined in the above summary and as described in the following description. The information elements collected by the NN control means 200 according to the present disclosure are collected from one or more entities of the wireless communication network, such as at least one NN, at least one BS and/or eventually an optional control and management means 306 which will be introduced in relation to FIG. 3, and/or a network means which e.g. provides service requirements. The mentioned network means can be, for example, a Policy and Charging Rules Function (PCRF) as in LTE, and/or an Application Programming Interface (API), e.g., as considered in European Telecommunications Standards Institute (ETSI) network functions virtualization (NFV) specification. Consequently, the information elements may include at least one of, or any preferred combination of the following pieces of information received from one or more NNs, one or more BSs or the Control and Management means 306: backhaul link quality, NN capabilities, NN owner preferences, NN location/parking duration history, NN expected parking duration, NN identifiers, BS loads, NN radio measurements from BSs, coverage needs, capacity needs, service requirements, and/or NN activation requests.

Figure 3:
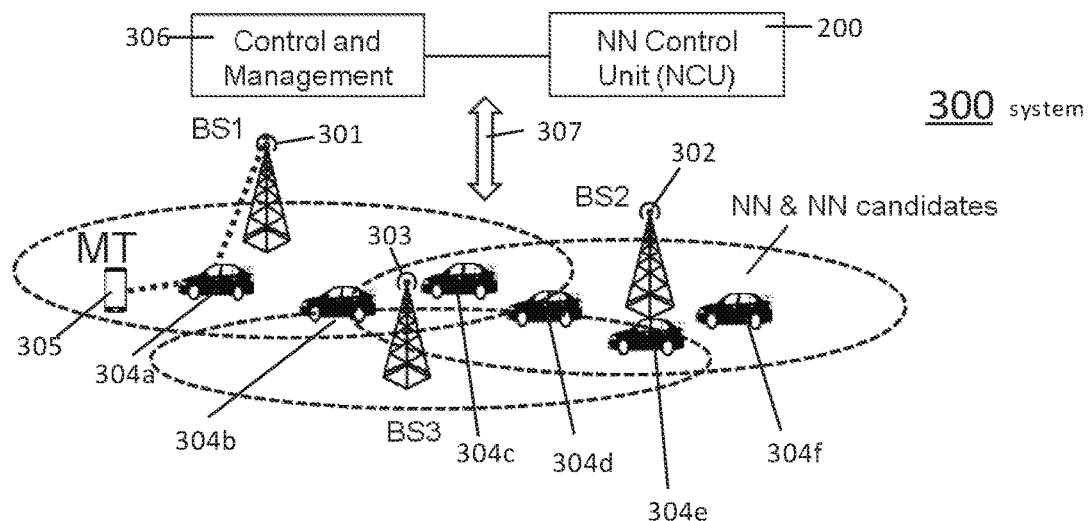
FIG. 3 shows an example of a system according to the present disclosure.

FIG. 3 shows an example of a system 300 according to the present disclosure. In the shown example, the wireless communication system 300 comprises a Control and Management means 306 (in the following also called "Control and Management", or "Control/Management" or the like), which communicates with a NN control means 200. The Control and Management means can be a single unit or device in the system 300, or may be part of another entity in the system, or a distributed over several entities. In the shown example, the NN control means 200 is a central NN Control Unit (NCU) i.e., a single central unit or entity in the system 300. Further below, a distributed approach will be described in which the NN control means 200 is distributed in several separate entities. The system 300 further comprises, in the shown example, a first Base Station (BS1) 301, a second Base Station (BS2) 302 and a third Base Station (BS3) 303, which have partially overlapping coverage areas represented by the circles in dashed lines around each Base Station 301, 302 and 303. A coverage area may imply an area where a required level of wireless link quality can be maintained. The system 300 further comprises a plurality of NNs, with each NN being mounted on or provided via a vehicle as shown. The Nodes are represented by the references numbers 304a, b, c, d, e, f, g, h, i (see the other figures) wherein one of the NNs, namely the NN 304a, serves on a Mobile Terminal (MT) 305, as shown by the dashed line. For the sake of simplicity, in the following description, a Nomadic Node NN will be represented by reference number 304 in reference to the various drawings, wherein it should be clear that the individual NNs 304a to 304i are intended to be referenced. The Control and Management means 306 and the NN control means 200 may communicate over a fixed line or wireless communication channel. The NN control means 200 and the BSs may communicate over a fixed line or wireless communication channels. The BSs and the NNs and the MTs, UEs communicate over wireless communication. The arrow 307 depicts the set of communication protocols, messages, and so forth exchanged between the Control and Management means 306 and the NN control means 200 and the Base Stations of the system, such as the first Base Station 301, the second Base Station 302 and the third Base Station 303, as well as the NNs, MTs, and other network entities of the radio access network.

Herein, details of the aforementioned mechanisms are described. First, the mechanism on how the NN registration to the network is performed when a new NN 304 becomes available in a Target Service Region is explained. The associated information elements are also described. An information element encapsulates a single piece or a set of pieces of information or instruction which can be, e.g., sent from one system entity to another to perform a determined task as part of a method. Then, the mechanisms on how serving NNs, mirror NNs, and serving BSs are determined in case of the centralized method are described. The notions of the mirror NN, state transitions, and signal flow diagrams are given. The distributed and hybrid methods are described along with their signal flow diagrams.

Herein, different modes for NN operation are proposed. When a NN 304 is not actively serving mobile terminals MTs, e.g., is outside the target service region, and is not registered to the network as candidate NN, that nomadic node NN is in the idle NN mode. After the network registration is completed, e.g., when the NN 304 enters the target service region, the nomadic node becomes the candidate NN. In the candidate NN mode, the candidate NN is not prepared to actively serve and thus not actively serving. In the candidate NN mode, the NN may be in an energy-saving mode. When the candidate NN is activated, the candidate NN enters the active NN mode, in which it is prepared to actively serve MTs. In the activated mode, the active (activated) NN is prepared to or is ready to serve MTs, which means that the active NN is in a state in which it immediately, without much further information exchange with the NN control means 200 or any other entity, serve a MT which is in the vicinity of the active NN and with which it has a link quality above a preset threshold. In the activated mode, the NN may regularly transmit beacons or reference symbols so that it can be detected by a MT as an activated NN. In order to avoid service interruption, a candidate NN can be configured as the mirror NN of an active NN, of which details are explained in the following.

Network operators can determine target service regions, in which vehicles can be parked and in which the vehicles can provide service via their NNs in terms of increasing the cell coverage and network capacity. These places can be close to hot spots, for example, close to shopping malls or business centers. Such parking lots close to dense human existence can be potential target service regions.

Target service region maps can be created offline, and can be sent to NNs in advance. The target service regions can be identified via network planning tools, where, for instance, coverage holes and capacity needs can be identified. Further, the network statistics and radio performance indicators collected by the network can be utilized to determine target service regions. Available charging options can be used in determining the target service regions. For example, a region with better conditions for energy harvesting and/or regenerative energy sources and/or wireless charging and/or wired charging can be taken into account.

A target service region 604 (cf. FIG. 6) can define a geographical location with time stamps. For example, the size of the region may change during the day time as well as the regions may change. Target service region maps can be dynamically updated, for example, depending on the user load. In particular, the network can update the information about the target service regions in the NNs on a need-basis or regularly (long-term or mid-term). For example, in case of an event like a concert, the target service region maps will be updated based on time (e.g., 18:00-20:00 CET) and space (e.g., GPS/GLONASS coordinates of the parking lots around the event). The geographical location can imply GNSS coordinates (e.g., GPS, cell ID, e.g., as in an LTE system, angular position, e.g., azimuth and elevation, along with radial distances with respect to a reference point or node, e.g., a BS).

A target service region can be considered with dimensions of space and time. It can be defined by a map with time stamps and stored in a vehicle. A NN may initiate trigger messages to the network only if it is in the target service region. By defining the target service regions, the signaling overhead can be clearly reduced and clear energy savings can be possible.

Existing fixed access node deployments can be also taken into account, for example, a region that can be served by activating picocells may shrink the target service region of NNs. When target service regions are updated, this update information can be communicated to the relevant NNs. NNs may receive the updates from the network wirelessly or via a wired backhaul, for example, while charging or from other NNs via a vehicle-to-vehicle communication link.

In addition, the target service regions may be different for NNs having different access link capabilities, for example WiFi or licensed band operation at 2 GHz or mm-Wave bands. The target service regions may also be based on the vehicle context information, such as current battery status of the vehicle and/or charging capabilities of the vehicle. For example, a target service region may be dedicated to long-term NN operation and thus only NNs with a possibly longer battery support may be eligible for that target service region.

An example of a method for NN registration to the network according to the disclosure is described in the following.

When a NN 304 arrives to a target service region or the vehicle (on which NNs are transported or integrated) is parked longer than a determined threshold, and/or the NN 304 determines that it can be a candidate NN for the current location/Target Service Region, the NN 304 performs registration to the network. Network operators can determine target service regions where the vehicles can be parked and the vehicles can provide a target service, e.g., in terms of increasing coverage and capacity. The target service region can be defined for a geographical location according to time stamps. A time stamp may, for instance, provide information regarding the validity period of a target service region. For example, the size of the region may change during the day time as well as the regions may change. The target service regions can be dynamically updated. In particular, the network can update the information about the target service regions in the NNs 304 on a need-basis or regularly. In addition, the target service regions may be different for NNs 304 with different capabilities, e.g., battery capacity and antenna implementation. The parking time threshold above which the NN 304 performs the registration to the network can be determined based on the nomadic node NN owner preferences and/or network operator preferences. The parking time is time during which the vehicle of the NN 304 is parked. This threshold can depend on the target service region, as well. That is, different target service regions may be assigned to different thresholds. These thresholds can also be modified according to the local traffic rules for a given location or target service region. Further, the target service regions can comprise determined requirements for the needed NN candidate. For example, such requirements may include NN capabilities (thus, nomadic node capability class, e.g., determined by the network operator and/or nomadic node owner), such as, antenna capabilities, and estimated NN operation time based on the current level of the battery. Accordingly, a registration event is triggered at the NN when a configured NN candidate status is decided by the NN 304 based on the aforementioned cases. The NN registration is performed to the NCU 200, which can be central unit, e.g., at Operation, Administration, Maintenance (OAM), as in the centralized method, or can be an NCU functionality distributed over base stations BSs, 301, 302, 303 as in the distributed method.

Figure 4:
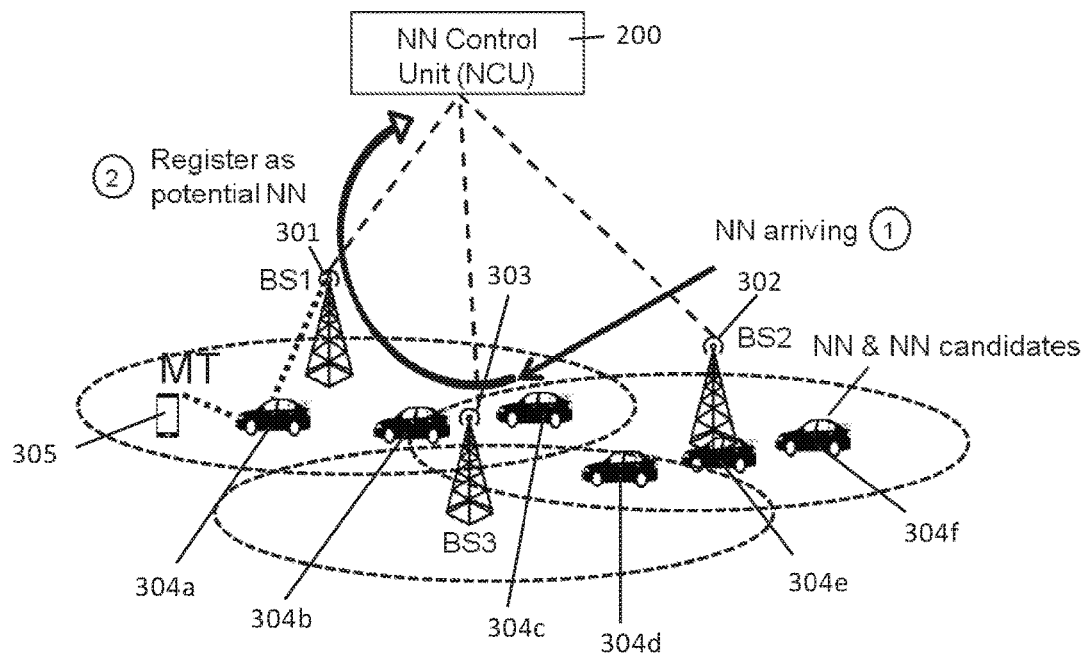
FIG. 4 shows an example of a new NN arriving in a system according to the present disclosure.

FIG. 4 shows an example of a NN registration to the network (i.e., NCU 200) when a new NN 304 is triggered to perform the registration.

When the registration event to the network is triggered according to the aforementioned cases, the following method steps are executed as illustrated in FIG. 4:

The NN 304 performs a cell selection and camps in the selected cell.
  The cell selection can be based on the received signal power on the backhaul link of the NN 304, e.g., the cell with highest Reference Signal Received Power (RSRP) as in long-term evolution (LTE).
  The cell selection may be based on the pre-determined preferred serving cell for the target service region, in which the NN 304 is currently present. The preferred serving cell can be included in the target service region maps that were saved at the NN 304 or broadcast by the network.

The NN 304 performs the registration procedure and sends its context information to the network, e.g., the base station BS 301, 302, 303 of the macrocell and NN control unit NCU 200. The sent context information can comprise:
  Backhaul Link Quality, e.g., based on the signal-to-interference-plus-noise ratio (SINR), long-term (shadowing-related) backhaul-link measurements towards the selected BS for camping and/or the base stations BSs that can be measured by the NN 304. The number of base stations BSs 301, 302, 303 for which the measurements are performed can be pre-determined or based on the target service region.
  Nomadic node capability class and/or nomadic node capabilities that comprise
    Available radio access technologies (RATS) for the Backhaul Link and Access Link
    Battery Level and/or predicted nomadic node operation for a given nomadic node capability class
    Antenna characteristics, such as, multiple-input multiple-output (MIMO) capability (number of elements, and beamforming), Maximum Transmit power, Antenna Constellation on the Vehicle, Operating Frequencies
  Nomadic node owner preferences that comprise
    Support for single or multiple operators, level of compensation achieved (e.g., monetary), battery threshold above which the nomadic node NN can operate
  Nomadic node history for nomadic node operation for the current driver
    This information can be used to estimate the parking duration
  Nomadic node NN identifier, which can, e.g., also identify the nomadic node NN owner An example of a method for determining active and mirror NNs 304 with the centralized Method according to the disclosure is described in the following relation to FIG. 5.

Figure 5:
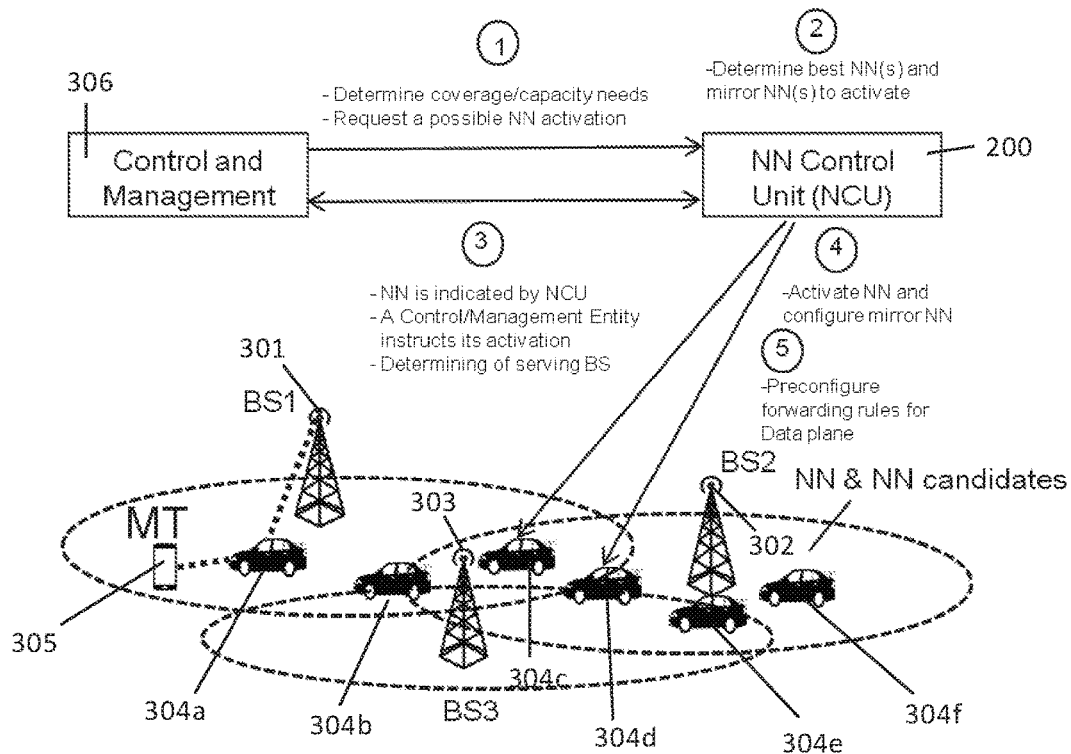
FIG. 5 shows an example of an activation of a NN in a system according to the present disclosure.

The following steps are explained in association with FIG. 5.

1. A control (e.g., radio resource management (RRM) as in 3GPP TS 36.300 Evolved Universal Terrestrial Radio Access (E-UTRA) and Evolved Universal Terrestrial Radio Access Network (E-UTRAN); Overall description, or management (e.g., network element manager 300, as in 3GPP TS 32.101 Technical Specification Group Services and System Aspects; Telecommunication management; Principles and high level requirements, entity communicates to the NN control unit NCU 200 with service requirements in a target service region 604 (e.g., coverage or capacity) and requests NN activation.

2. The NCU 200 determines nomadic node(s) NN(s) 304 to be activated from the list of candidate NNs and their mirror NN(s) based on collected Information Elements from BSs 301, 302, 303 and NNs 304 (such as, BSs and their loads, candidate NNs in the target service area and their capabilities, the users that need to be served in the area, nomadic node radio measurements from multiple BSs, and the context information sent during network registration as mentioned before) and, also, determines the serving BS(s) for each of the NNs 304 to be activated and mirror NN(s).

3. The Control/Management Entity 306 instructs the NN control unit NCU 200 to activate the determined NNs 304 to be activated and to configure the associated mirror NNs.
4. The NN control unit NCU 200 activates NNs 304 and configures their mirror NNs.
5. The NN control unit NCU 200 preconfigures forwarding rules for data plane.

Figure 6:
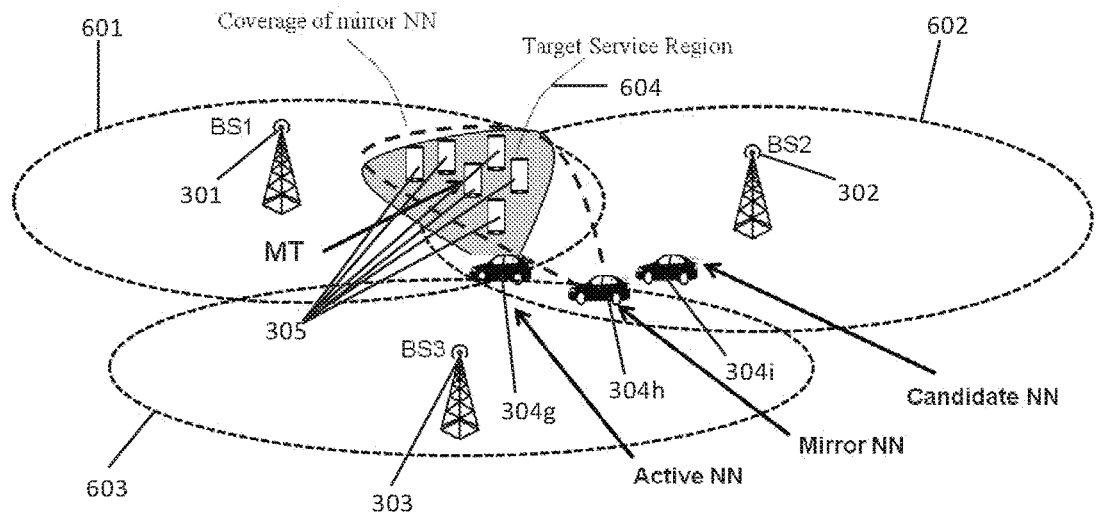
FIG. 6 shows an example of an active NN and its mirror NN in a target service region of the present disclosure.

FIG. 6 shows a schematic representation to explain the notion of mirror nomadic node NN.

As depicted in FIG. 6, a mirror NN 304*h* covers the same or similar coverage area of the corresponding active NN 304*g*. The mirror NN 304*h* is configured to have the same configuration with the active NN 304*g* {e.g., master information block; MIB, system information block; SIB (Cell ID, etc.) in LTE}. Thus, when the active NN 304*g* departs, no handover may be initiated by the served users. The mirror NN 304*h* is aimed to avoid service interruption. The transition from mirror NN 304*h* to active NN 304*g* can depend on the NN type (e.g., Layer 1, 2, or 3 relaying operation). The active NN 304*g* can send Information Elements to the mirror NN 304*h* upon transition, e.g., downlink packet data convergence protocol (PDCP) has successfully transmitted packets, via, e.g., car2car communication link between the active NN 304*g* and the mirror NN 304*h*.

Figure 7:
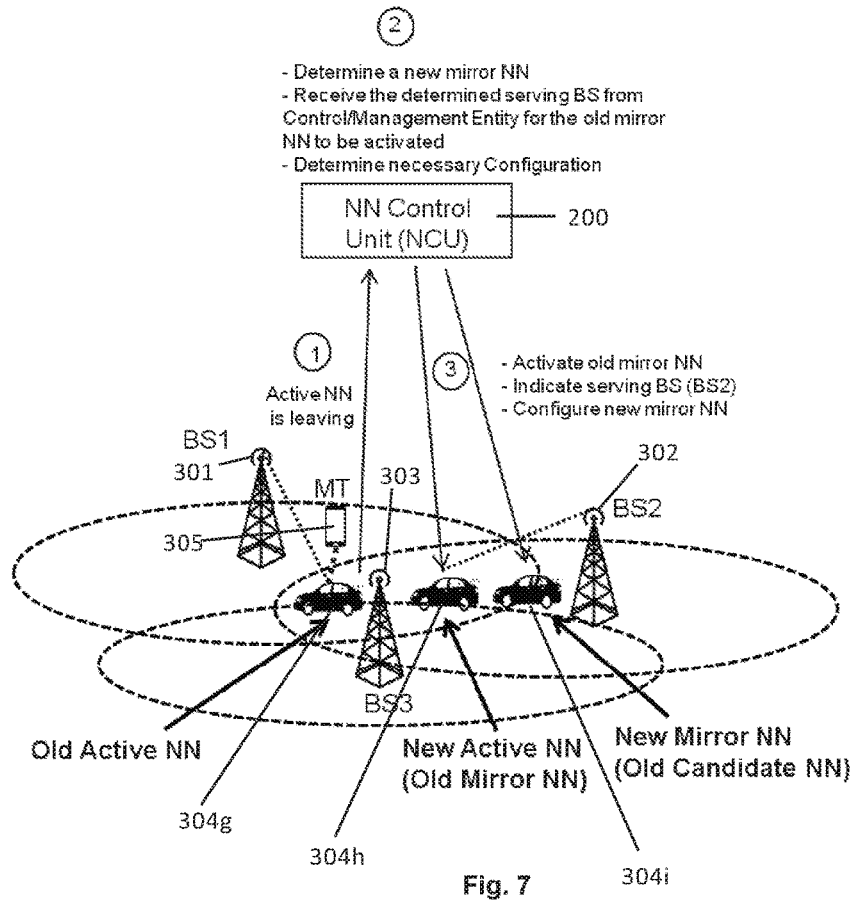
FIG. 7 shows an example of a mirror NN take in the place of an old active NN in a system according to the present disclosure.

When an active NN 304*g* is leaving the target service region 604, it is substituted by its mirror NN 304*h* when it is available. Switching to the mirror NN 304*h* is performed by the following steps, which are illustrated in FIG. 7. FIG. 7 shows an exemplary illustration for switching to a mirror NN 304*h* from active NN 304*g*.

1. An active NN 304*g* associated with BS1 301 is leaving the target service area 604 and signals this to the NN control unit NCU 200. This leaving active NN 304*g* is denoted as old active NN 304*g* in FIG. 7.
2. The NN control unit NCU 200 receives determined serving BS (in this example BS2 302) from Control/Management Entity 306 for the mirror NN 304*h* of the leaving active NN 304*g*. The mirror NN 304*h* (denoted by old mirror NN and new active NN in FIG. 7) of the leaving active NN 304*g* is activated as the new active NN 304 served by BS2 302.
3. The NCU 200 configures a new mirror NN 304*i* from the candidate NN list for the newly activated NN 304*h*. This new mirror NN 304*i* is denoted by new mirror NN and old candidate NN in FIG. 7.

Here, the mirror 304*h* NN of the leaving active NN 304*g* may already have been determined before the active NN 304*g* leaves. In this case, in Step 2, the existing mirror NN 304*h* of the leaving active NN 304*g* is activated. Also, when the mirror NN 304*h* of the leaving active NN 304*g* is not able to provide service for the target service region 604 alone other mirror NN(s) and/or candidate NN(s) and/or small cells may be activated.

Figure 8:
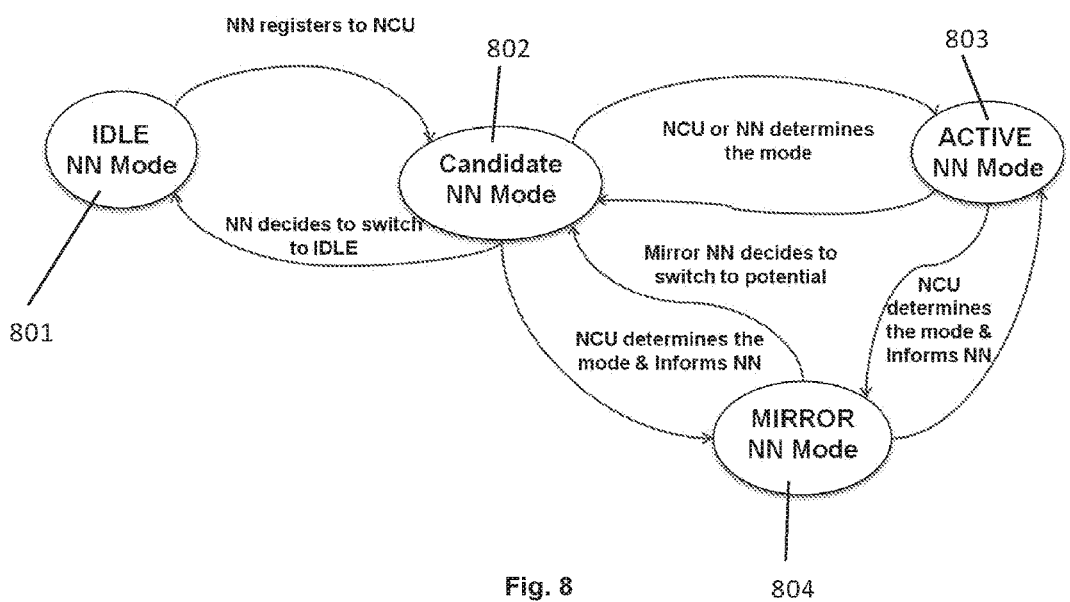
FIG. 8 visualizes the various modes of a NN according to the present disclosure.

In order to increase the operational efficiency of nomadic nodes NNs 304, different modes and the associated mode/state transitions are described herein. An example illustration for the mode/state transitions is depicted in the schematic mode transition diagram of FIG. 8. When a NN 304 is not prepared to actively serve or not actively serving MTs 305 or equivalently UEs, e.g., outside the target service region 604, and the network registration procedure, as described above, is not triggered in general, that NN 304 is in the idle NN mode 801. During the idle NN mode 801, the NN 304 may have an active UE mode, where it can communicate with the network and operate as a normal mobile terminal MT 305 from the network's perspective, e.g., for getting the target service region maps. Further, the NN 304 may have a moving relay mode, where it can serve in-vehicle users and/or outside-vehicle users. These modes can be determined by the NN control unit NCU 200. When the network registration event is triggered, the NN 304 registers to the NCU 200 and changes its mode from idle NN mode 801 to candidate NN mode 802. When the NN 304 is selected as the active NN (i.e., is prepared to and can serve mobile terminals MTs 305), the NN 304 will change its status from candidate NN mode 802 to active NN mode 803. Similarly, when the NN 304 is not the active NN (i.e., not serving) but a candidate NN, it will switch its mode from active NN mode 803 to candidate NN mode 802. The transitions may be between any of these modes, e.g., the active NN may switch directly to idle NN mode 801, when the active NN is leaving the target service region. The transitions may be instructed by the NN control unit NCU 200 or determined by the NN 304 itself.

The candidate NN mode 802 can be optional. That is, the NN 304 may switch from idle NN mode 801 directly to active NN mode 803. The transitions between the modes can be determined based on the requirements of the target services, e.g., latency.

Figure 9:
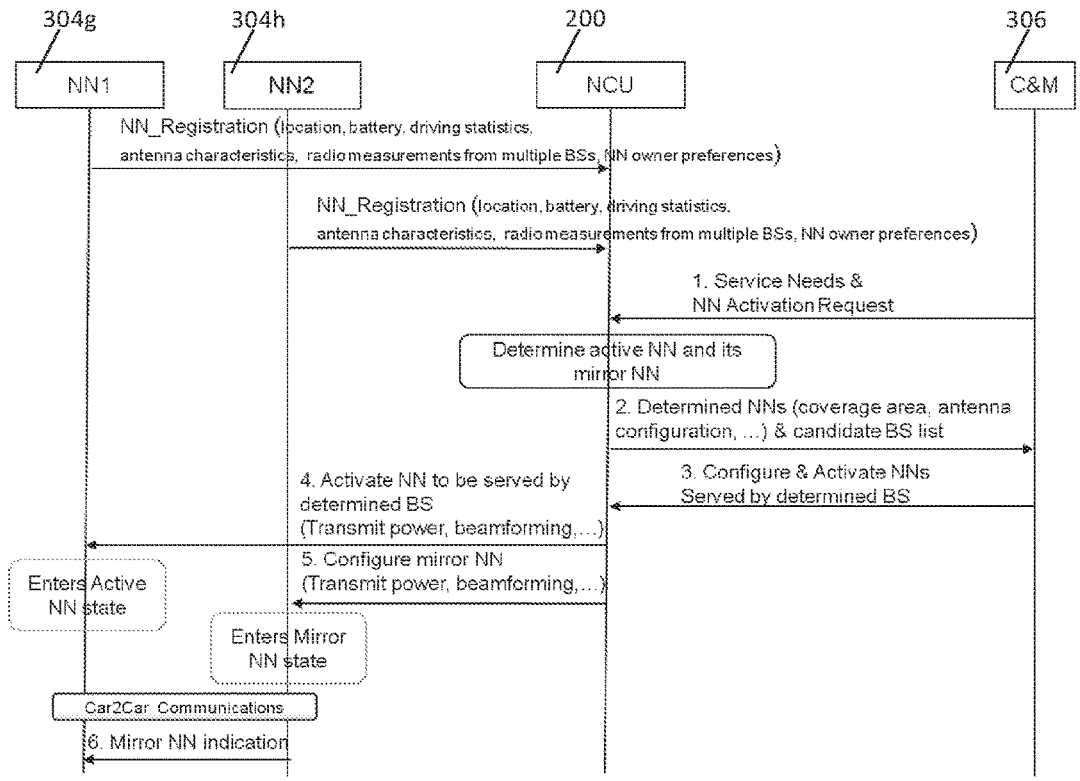
FIG. 9 shows a flow diagram of a method according to the present disclosure.

An example signal flow diagram for nomadic node network registration, determining of active and mirror NNs, and mode changes (as in the situation of FIG. 6) is given in FIG. 9, where a new NN1 304*g* and a new NN2 304*h* are triggered for network registration. During the registration, NN1 304*g* and NN2 304*h* send the information elements to NN control unit NCU 200, as exemplified before. Depending on the service needs, e.g., in the target service region, control and management 306 requests NN activation by NN control unit NCU 200. Upon this request, the NN control unit NCU 200 determines active NN 304*g* and its corresponding mirror NN 304*h* as well as the candidate serving base station BS list. The NN control unit NCU 200 sends the determined active NN 304*g*, mirror NN 304*h*, and candidate BS list to control and management 306. The control and management 306 commands NN control unit NCU 200 for activation and configuration of NNs along with the determined serving BS. Accordingly, the NN control unit NCU 200 activates the NN1 304*g* as active NN1 304*g* to be served by the determined BS and configures NN2 304*h* as the mirror NN 304*h* adjusted by the configuration of the NN1 304*g*. In this example, the NNs set-up car2car communications in an ad-hoc manner or network-assisted manner and the NN2 304*h* informs the NN1 304*g* regarding its mirror NN state. The indication that NN2 304*h* is the mirror NN 304*h* for NN1 304*g* can also be indicated by the NN control unit NCU 200. The active NN1 304*g*, may inform the network about the available car2car link. The selection of the serving base station BS can be based on, for example, the best backhaul link quality, according to the received measurements, the current load of cells served by the BSs, and the backhaul link capacity of the BSs toward the core network.

Figure 10:
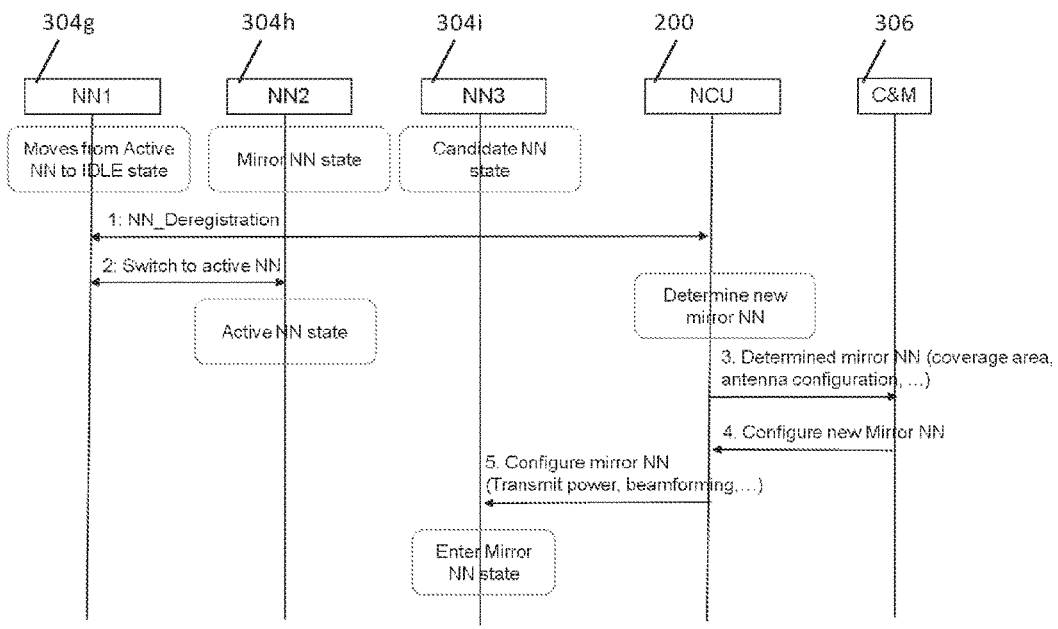
FIG. 10 shows a flow diagram of another method according to the present disclosure.

An example signal flow diagram for determining a new mirror nomadic node NN (as in the situation of FIG. 7) is illustrated in FIG. 10, where the active NN1 304*g* moves from active NN state 803 to idle NN state 801. In this case, the NN1 304*g* deregisters at the NN control unit NCU 200. If there is a car2car communications link is available between NN1 304*g* and NN2 304*h* or can be made available, this information of state changing is indicated to the NN2 304*h* by the NN1 304*g*. Alternatively, the NN control unit NCU 200 can also inform NN2 304*h* for the state (mode) change. Accordingly, the NN2 304*h* switches to the active NN state (mode) 803. The NN control unit NCU 200 determines a new mirror NN 304*i*, which is the NN3 304*i* in this illustration, e.g., from the candidate NN list, and communicates this information with the control and management 306. The control and management 306 approves the new selection and instructs the NN control unit NCU 200 with the configuration of the mirror NN3 304*i*. The NN control unit NCU 200 configures the mirror NN3 304*i*, upon which the NN3 304*i* enters the mirror NN state (mode) 804.

Figure 11:
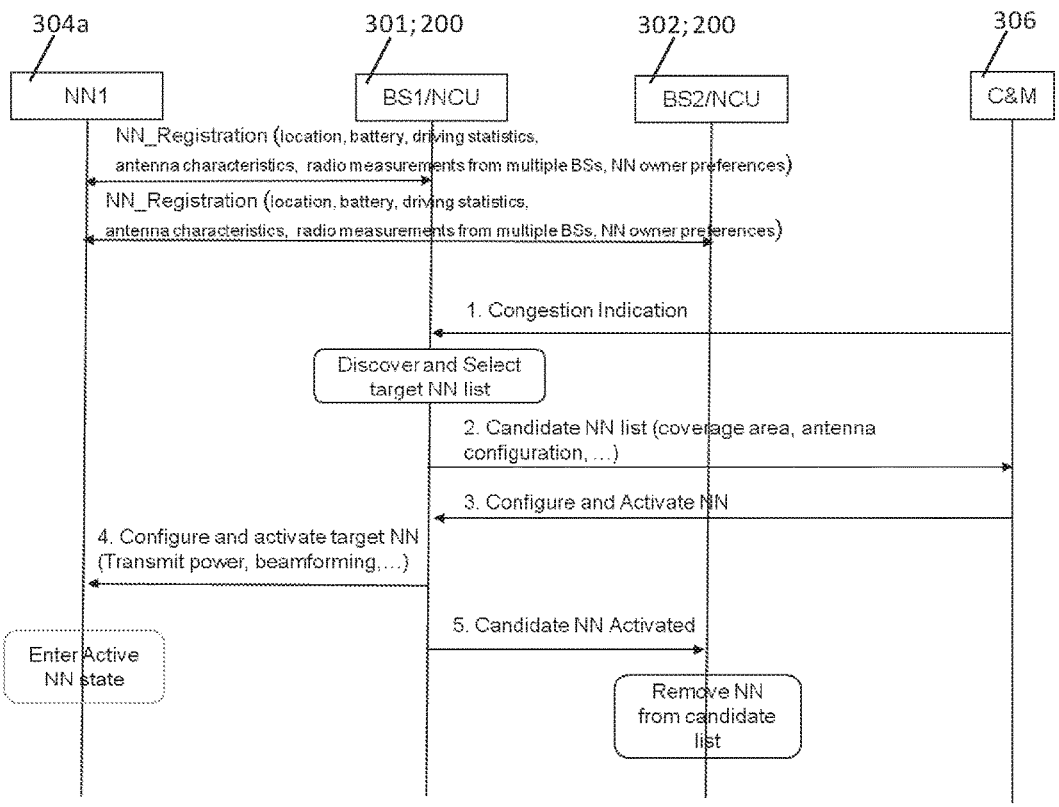
FIG. 11 shows a flow diagram of another method according to the present disclosure.

An example signal flow diagram for nomadic node NN network registration and determining of active nomadic node NN is illustrated in FIG. 11 for the case of the distributed method. In the distributed method, the NN control unit NCU 200 functionality is distributed over multi-BSs (here BS1 301 and BS2 302). When a new NN1 304*a* is triggered with the registration event, it registers at both BS1-NCU and BS2-NCU. Alternatively, BS1-NCU can inform BS2-NCU when the new NN1 304*a* registers at BS1-NCU. In case that control and management 306 determines a congestion or a need for NN activation to provide service in a given target service region 604 within the coverage of base stations BS1 301 and BS2 302, it will indicate a request to the NN control unit NCU 200 functionalities at base stations BS1 301 and BS2 302. In this example case, BS1-NCU has the master responsibility for the target service region 604; thus, BS1-NCU determines and selects the target NN list and sends this information to control and management 306. Upon the receipt of acknowledgement and instruction from the control and management 306, BS1-NCU configures and activates the NN1 304*a* and informs BS2-NCU that the NN1 304*a* is activated for the target service region 604. The ID of the target service region 604 is communicated to the BS2-NCU in this phase. Accordingly, BS2-NCU removes NN1 304*a* from the candidate NN list. The NN1 304*a* enters the active NN mode 803.

Figure 12:
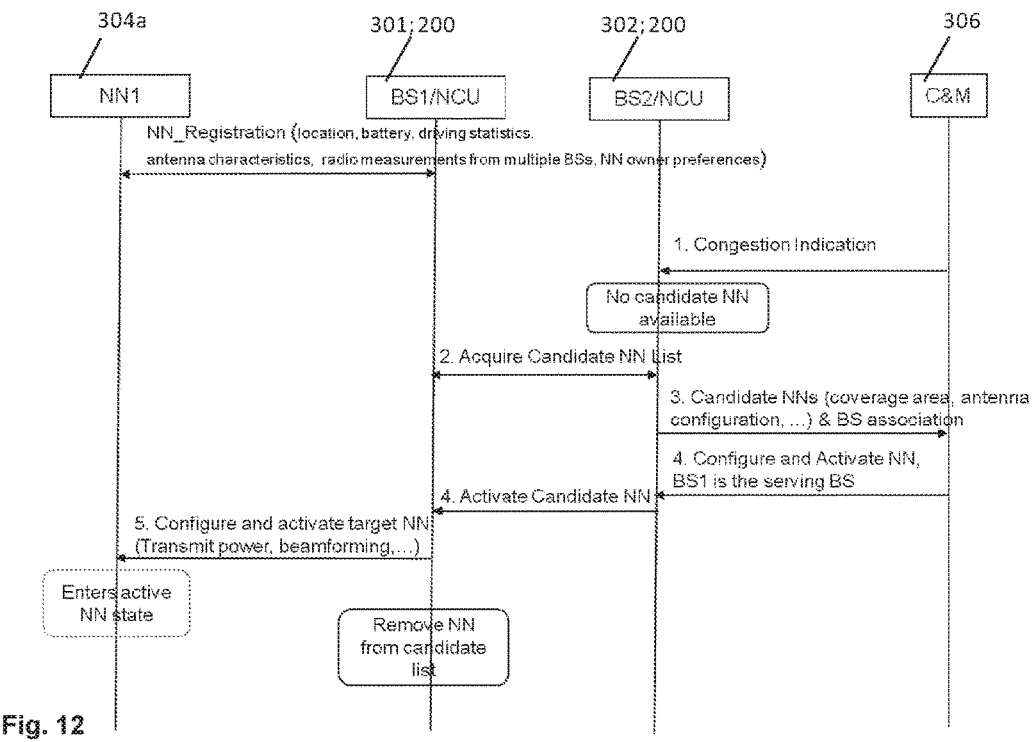
FIG. 12 shows a flow diagram of another method according to the present disclosure.

An example signal flow diagram for nomadic node NN network registration and determining of active nomadic node NN is illustrated in FIG. 12 for the case of the hybrid method. Similar as in the distributed method, the NN control unit NCU 200 functionality is distributed over multi-BSs (here base stations BS1 301 and BS2 302). When a new NN1 304*a* is triggered with the registration event, it registers only at BS1-NCU, e.g., based on the RSRP. Thus, the possible nomadic node NN list including nomadic node NN1 is only known to BS1-NCU (which in the difference to the distributed method of FIG. 11). In case that control and management 306 determines a congestion or a need for NN activation to provide service in a given target service region 604 within the coverage of base station BS2 302, it will indicate a request to the NN control unit NCU 200 functionalities at base station BS2 302. In this example case, BS2-NCU does not have NN candidates; thus, BS2-NCU requests from BS1-NCU for the adequate NN candidate list for the target service region 604. The acquired NN candidate list and possible serving base station BS list are sent to the control and management 306. The control and management 306 commands BS2-NCU to configure and activate the determined NN1 304*a* and the serving base station BS1. BS2-NCU communicates this command to BS1-NCU. Accordingly, BS1-NCU activates NN1 304*a* and removes it from the NN candidate list. The nomadic node NN1 304*a* enters the active nomadic node NN state 803.

The present disclosure enables on-demand network coverage and capacity management by dynamically and optimally employing nomadic nodes NNs in a multi-BS topology. Dynamically activating and deactivating nomadic nodes NNs in an operating mobile network is essential for the optimal NN operation which is expected to create new vertical industry (automotive) opportunities.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A method for activating a Nomadic Node (NN) in a wireless communication network having at least one base station (BS) and a NN control means, the method comprising:
   collecting, by the NN control means, information elements in the wireless communication network;
   registering, by the NN control means, the at least one NN to the NN control means, wherein the wireless communication network comprises at least two distributed NN control entities as the NN control means, each of the at least two distributed NN control entities being respectively located at a BS of the wireless communication network, and wherein the NN is registered to one of the at least two distributed NN control entities; and
   activating, by the NN control means, the NN on the basis of the collected information elements.

2. The method for activating an NN according to claim 1, further comprising:
   selecting a serving BS for the at least one activated NN from said at least one BS.

3. The method for activating an NN according to claim 1, wherein collecting the information elements by the NN control means comprises:
   collecting the information elements from at least one of the NN, the at least one BS and a network means.

4. The method for activating an NN according to claim 1, further comprising:
   communicating, by the NN control means, with a control and management means comprised in the wireless communication network; and
   wherein collecting the information elements by the NN control means comprises:
      collecting the information elements from at least one of the NN, the at least one BS, a network means and the control and management means.

5. The method for activating an NN according to claim 1, wherein the information elements include at least one of:
   Backhaul link quality;
   NN capabilities;
   NN owner preferences;
   NN location/parking duration history;
   NN expected parking duration:
   NN identifiers;
   BS loads, NN radio measurements from BSs;
   coverage needs;
   capacity needs;
   service requirements; and
   NN activation requests.

6. The method for activating an NN according to claim 1, wherein activating, by the NN control means, the NN comprises:
  activating the NN from an idle mode to an activated mode, wherein the idle mode is a mode in which the NN is not registered to the NN control means and not prepared to actively serve a mobile terminal in the wireless communication network and the activated mode is a mode in which the NN is prepared to actively serve a mobile terminal in the wireless communication network.

7. The method for activating an NN according to claim 1, wherein activating, by the NN control means, the NN comprises:
  activating the NN from a candidate mode to an activated mode, wherein the activated mode is a mode in which the NN is prepared to actively serve a mobile terminal in the wireless communication network and the candidate mode is a mode in which the NN is registered to the NN control means as a potential NN and not prepared to actively serve a mobile terminal in the wireless communication network.

8. The method for activating an NN according to claim 1, wherein before activating, by the NN control means, the NN, the method further comprises:
  registering, by the NN control means, the NN to the NN control means, wherein the wireless communication network comprises only a single NN control unit as the NN control means, and the NN is registered to the single NN control unit.

9. The method for activating an NN according to claim 1, wherein before activating, by the NN control means, the NN, the method further comprises:
  registering, by the NN control means, the NN to the NN control means, wherein the wireless communication network comprises at least two distributed NN control entities as the NN control means, each of the at least two distributed NN control entities being respectively located at a BS of the wireless communication network, and wherein the NN is registered to each of the at least two distributed NN control entities.

10. The method for activating an NN according to claim 1, further comprising:
  configuring, by the NN control means, a mirror NN for each activated NN with a same or similar configuration as the respective active NN, each mirror NN being an NN with at least partially overlapping coverage area as its respective activated NN.

11. The method for activating an NN according to claim 10, wherein when an activated NN is deactivated, the NN control means activates the respective mirror NN as the new activated NN.

12. The method for activating an NN according to claim 11, further comprising:
  Configuring, by the NN control means, a new mirror NN from NNs in the wireless communication network with a same or similar configuration as the new activated NN.

13. A Nomadic Node (NN) control means for a wireless communication network having a NN and at least on base station (BS), the NN control means comprising:
  collecting means for collecting information elements in the wireless communication network;
  registering means for registering the at least one NN to the NN control means, wherein the wireless communication network comprises at least two distributed NN control entities as the NN control means, each of the at least two distributed NN control entities being respectively located at a BS of the wireless communication network, and wherein the NN is registered to one of the at least two distributed NN control entities; and
  activating means for activating the NN on the basis of the collected information elements.

14. A system for use in a wireless communication network, the system comprising:
  a Nomadic Node (NN);
  at least one base station (BS); and
  an NN control means configured to:
    collect information elements in the wireless communication network,
    register the NN to the NN control means, wherein the wireless communication network comprises at least two distributed NN control entities as the NN control means, each of the at least two distributed NN control entities being respectively located at a BS of the wireless communication network, and wherein the NN is registered to one of the at least two distributed NN control entities, and
    activate the NN on the basis of the collected information elements.

* * * * *